(12) United States Patent
Hiraoka et al.

(10) Patent No.: US 7,154,644 B2
(45) Date of Patent: Dec. 26, 2006

(54) IMAGE READER

(75) Inventors: Takahiro Hiraoka, Himeji (JP); Koji Oda, Takasago (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 779 days.

(21) Appl. No.: 10/014,453

(22) Filed: Dec. 14, 2001

(65) Prior Publication Data

US 2002/0080431 A1    Jun. 27, 2002

(30) Foreign Application Priority Data

Dec. 21, 2000    (JP)    ............................. 2000-388486

(51) Int. Cl.
*H04N 1/46*    (2006.01)
(52) U.S. Cl. ...................... 358/509; 358/505; 358/514; 358/504; 315/219; 315/291
(58) Field of Classification Search ................ 358/509, 358/514, 504–505; 315/219, 291
See application file for complete search history.

(56) References Cited

U.S. PATENT DOCUMENTS

| 5,384,456 | A | 1/1995 | Saika et al. | |
|---|---|---|---|---|
| 6,369,519 | B1 | 4/2002 | Okamoto et al. | |
| 6,483,253 | B1 * | 11/2002 | Okamoto et al. | ............ 315/219 |
| 6,661,545 | B1 * | 12/2003 | Sato et al. | ................... 358/509 |

FOREIGN PATENT DOCUMENTS

| DE | 199 56 274 | 5/2000 |
|---|---|---|
| JP | 62-143552 A | 6/1987 |
| JP | 9-9007 A | 1/1997 |
| JP | 11-317203 A | 11/1999 |
| WO | WO 00/70918 | 11/2000 |

OTHER PUBLICATIONS

European Search Report, Application No. 01129849.4-1241, Dated Apr. 3, 2002.

* cited by examiner

*Primary Examiner*—Thomas D. Lee
*Assistant Examiner*—Heather D Gibbs
(74) *Attorney, Agent, or Firm*—David S. Safran

(57) ABSTRACT

An image reader of the stepping image reading type, by time division using a fluorescent lamp using a dielectric barrier discharge, in which for each divided image uniform lamp emission is always enabled and which can react advantageously especially when the image read rate increases is achieved by providing an image reader having a lighting part with a fluorescent lamp which use a dielectric barrier discharge and produces pulse emission and an inverter circuit which feeds this fluorescent lamp; a CCD line sensor which continuously receives the reflection light reflected by a manuscript and emitted by this fluorescent lamp, time-divided; and a controller which resets a divided image which is recognized by this CCD line sensor and which controls the timing of the start of recognition of the next divided image and which sends this timing signal to the inverter circuit as well, where the controller, within a given time in which the CCD line sensor recognizes a divided image of the manuscript, sends a flashing signal to the inverter circuit which corresponds to the frequency of pulse emission of the fluorescent lamp in order to keep the luminous quantities of the fluorescent lamp at a given value, where the lighting part, as an oscillator, drives the flashing signal of the inverter circuit and in this way, the fluorescent lamp carries out a pulse emission with a frequency which corresponds directly to the frequency of the flashing signal.

2 Claims, 6 Drawing Sheets external flashing signal external flashing signal

IMAGE READER

BACKGROUND OF THE INVENTION

1. Field of the Invention

The invention relates to an image reader. The invention relates especially to an image reader using a fluorescent lamp in which a dielectric barrier discharge is used.

2. Description of Related Art

Conventionally, various lamps are used as the light source of an image reader. When using a halogen lamp as the light source, there are the disadvantages that at least 80% of the power consumed is converted into heat and that, due to emission by means of a luminous filament, there is no resistance to vibrations. In a light source using a fluorescent lamp of the hot cathode type, in which mercury vapor is used, the thermal efficiency is higher than in a halogen lamp. However, there is the disadvantage that, depending on the distribution of the mercury vapor, the start-up characteristic of the lamp, the amount of light and the spectral distribution are affected. When using a fluorescent lamp of the cold cathode type, in which mercury vapor is used, there is the same disadvantage as in a fluorescent lamp of the hot cathode type because mercury vapor is used.

In view of these disadvantages and with respect to low power consumption, good start-up characteristic and little influence of the environment, a fluorescent lamp using a rare gas, such as xenon or the like, is used. Furthermore, a fluorescent lamp of the outer electrode type is used in which there is no electrode in the discharge vessel and which is operated by a dielectric barrier discharge to obtain a long service life.

FIG. 5 shows a schematic of one such image reader 1. A manuscript P is placed on the document glass 10. By illuminating the manuscript with the light emitted from a fluorescent lamp 2 (hereinafter also called only a "lamp"), the reflected light is incident on a CCD (charge-coupled device) line sensor 4 (hereinafter also called only a sensor 4). The fluorescent lamp 2 together with the inverter circuit 3 forms a lighting part which is located in a unit 5 which is triggered parallel to the document glass 10 based on a scanning signal S1 from the controller 6, as shown in the drawings. The sensor 4 extends in front of the manuscript page and can recognize the image part of the manuscript P which corresponds to the direction of extension of the sensor.

The sequence of operation of such an image reader 1 is described below.

First, the unit 5 starts scanning based on the signal S1 from the controller 6. When a signal S2 is sent from the controller 6 to the sensor 4, the image in the sensor 4 which had been received until then is reset and it is switched into the state in which a new image can be received. The signal S2 is also sent at the same time to the inverter circuit 3. The image received by the sensor 4 is sent as a signal S3 to the controller 6 in which processing of such image coupling or the like takes place. The control element 6, in this way, controls the images from the sensor 4 which were subjected to partial recognition.

The timing of the start of emission of the fluorescent lamp 2 is synchronized with the timing of switching of the image received by the sensor 4. The reason for this is that the sensor 4, as was described above, resets the received image at a specified time, for example, every 150 microseconds to 300 microseconds, and pulse emission of the fluorescent lamp 2 must be prevented at the instant of reset.

FIGS. 6(a) and 6(b) each schematically show this switching of the image received by the CCD line sensor 4 and the timing of the pulse emission of the fluorescent lamp 2. FIG. 6(a) shows the timing of the switching of the image received by the sensor 4, and FIG. 6(b) shows the timing of pulse emission of the lamp 2.

The drawings show that the sensor 4 erases the information of the image received until the controller 6 sends a signal S2 to the sensor 4 at time t1. The sensor 4 then remains on stand-by in the state in which it can recognize the image to be received next. Reference number T12 labels the period up to time t2 in which the next signal S2 is sent. This period T12 is the period in which the same image is received.

On the other hand, if the controller 6 sends the signal S2 to the inverter circuit 3, the inverter circuit 3 starts a drive, this signal S2 acting as the trigger. Then, based on an oscillator located in the inverter circuit, switching is performed, by which the lamp is subjected to pulsed luminous operation with a given interval.

By this operation, the lamp 2 undergoes pulse emission for a period T12 in which the sensor 4 receives a divided image, with a certain frequency, for example, 20 times (in the case of one read period of 300 microseconds and an oscillation period within the inverter of 15 microseconds). When the next signal S2 is sent to the inverter circuit 3 (time t2), the inverter circuit again starts a drive when the signal is received, synchronously with switching of the image received by the sensor.

The reason why this synchronization is necessary is the following:

In the case in which pulse emission of the lamp 2 is delayed for any reason, this delay time accumulates according to the frequency of pulse emission. This results in the phenomenon that the timing of the pulse emission of the lamp 2 agrees with the timing of the reset of the sensor 4 or that a given pulse frequency is not obtained in an image recognition interval and that for example there is no pulse. This phenomenon means that the entire emission amount of the lamp fluctuates in one read period. This results in the problem that the sensor can no longer clearly and accurately recognize images. To eliminate these disadvantages, each time the image received by the sensor 4 is switched, the timing of the emission of the lamp 2 is re-synchronized.

Also, when the timing of the start of pulse emission of the fluorescent lamp is synchronized in this way with the timing of the switching of the image received by the sensor, however in the period in which the image is received (T12, T23 in FIGS. 6(a), 6(b) and the like) in the timing of the pulse emission, a deviation is formed by which the same disadvantages as the above described disadvantages occur. Specifically, the last pulse emission agrees with the timing of image switching of the sensor and that, furthermore, the last pulse emission does not take place.

FIGS. 7(a), 7(b) and 7(c) each show a timing chart of one such state. FIG. 7(a) shows the timing of the switching of the image received by the sensor 4, as in FIG. 6(a). FIGS. 7(b) and 7(c) show the timing of the pulse emission of a lamp 2, as in FIG. 6(b). Here, there are feasibly 20 pulse emissions in one period.

FIG. 7(b) shows that, for the period T12, the 20-time emission $P1_{20}$ remains within the period, while for the period T23, the 20-time emission $P2_{20}$ agrees with the timing t3 of switching of the image recognized by the sensor. Furthermore, it is shown in FIG. 7(c) that the 20-time pulse emission $P2_{20}$ does not take place in the period T23 in which actually one emission is to take place.

When this situation arises, in the case of FIG. 7(b) a wrong signal is received by the sensor because the timing of the pulse emission agrees with the timing of sensor image switching. In case 7(c) only an amount of light can be obtained which corresponds to 19-time emission, although actually 20-times the amount of light should be received.

Furthermore, besides the two specific examples described above, it can of course also happen that within one period the timing of the pulse emission is accelerated and an amount of light is obtained which is larger than the amount of light which is actually desired (for the specific examples shown in FIG. 7, there are 21 pulse emissions within one period).

The occurrence of such a situation causes a change in the amount of light and mingling of anomalous signals in the image reading activity. As a result, a clear image cannot be obtained.

Especially recently has there been a tendency to increase the scanning rate of the unit due to the demand for an increase in the image reading rate. The emission frequency of the lamp in the time in which a divided image is received (T12, T23, T34 in FIGS. 6(a), 6(b) and FIGS. 7(a), 7(b) and 7(c)) is therefore reduced. Thus, there is the tendency for the luminous quantities to increase per pulse to maintain the total amount of light in one receiving period, instead of the preceding situation.

This circumstance is described specifically below.

When the frequency of the pulse emission at a receiving time for a divided image of roughly 150 microseconds to 300 microseconds decreases, for example, from 20 time to 15 times, the luminous quantities per time of the lamp must be increased, i.e., an emission is required by which the same total amount of light can be obtained by 15-times emission in order to maintain the entire amount of light. When the read rate is increased, the probability is increased that the above described deviation and the above described absence of pulse emission occur. At the same time, the ratio of the amount of emission of one pulse to the total amount of emission in one read period is increased. The disadvantages of the deviation and of the absence of a pulse therefore become more serious.

SUMMARY OF THE INVENTION

A primary object of the invention is to devise an image reader of the stepping image reading type by time division using a fluorescent lamp using a dielectric barrier discharge in which, for each divided image, uniform lamp emission is always enabled and can react advantageously, especially when the image read rate increases.

Particularly when using a fluorescent lamp from which UV radiation is emitted by dielectric barrier discharge for reading of color images, a fluorescing body of the white color type is used. The expression "white-color type" is normally defined as a mixture of fluorescing bodies which each correspond to a respective RGB color. For pulse emission, the fluorescent body has a persistence characteristic such that, especially the persistence time of the B (blue) portion, is very much shorter than for the other colors (R(ed), G(reen)). A different number of pulse emissions for a read processing interval therefore means a different accumulated amount of charge in the CCD. As a result, images which are output when an unpatterned manuscript is read become streaky and nonuniform.

As claimed in the invention in an image reader which comprises the following:

a lighting part which consists of a fluorescent lamp which using a dielectric barrier discharge executes pulse emission, and of an inverter circuit which feeds this fluorescent lamp 2;

a CCD line sensor which continuously receives the reflection light reflected by a manuscript and emitted by this fluorescent lamp, time-dividing; and a controller which resets the divided image which is recognized by this CCD line sensor and which moreover controls the timing of the start of recognition of the next divided image and which moreover sends this timing signal to the inverter circuit as well, the object is achieved in that the controller within a given time in which the CCD line sensor recognizes a divided image of the manuscript sends to the inverter circuit a flashing signal which corresponds to the frequency of pulse emission of the fluorescent lamp in order to keep the luminous quantities of the fluorescent lamp at a given value, that the lighting part as an oscillator drives the flashing signal of the above described inverter circuit and that in this way the fluorescent lamp carries out a pulse emission with a frequency which corresponds directly to the frequency of the flashing signal.

The image reader as claimed in the invention therefore consists of a lighting part, a CCD line sensor and a controller. The lighting part consists of a fluorescent lamp and an inverter circuit. The controller controls mainly the CCD line sensor and the like in the image reader. The invention has the feature that this controller sends a pulse flashing signal directly to the lighting part.

The inventors have found that the defect of irregularity of the emission period which arises in the conventional image reader is for the most part not caused by the fluorescent lamp, but by the inverter circuit. They have furthermore found that especially the control IC contained in the inverter circuit is relatively often subject to a temperature change and therefore the closed CR tuned circuit used in the control IC causes malfunctions. Furthermore, they have recognized that besides the oscillator of the control element present in the main part of the image reader for control of the CCD line sensor there is an oscillator for lamp emission in the lighting source and that control of the timing of the sensor and the lamp is a problem using two oscillators in this way. More exactly it is such that by increasing the image reading rate the effect of a one-time pulse emission of the lamp has become greater; this led to this control of the timing being directly influenced.

The image reader of the invention has the feature that the controller sends to the lighting part not only an emission start signal which synchronizes the switching of the image received by the sensor, as in a conventional image reader, but that the controller sends to the lighting part, a signal which commands pulse emission of the fluorescent lamp in itself.

The fluorescent lamp reacts specifically to the pulse signal which is stably sent by the controller of the image reader directly and when this flashing signal is received executes each pulse emission. Here, the term "stable" is not defined as the oscillation fluctuating due to external temperature conditions and the like, but is defined as the oscillation being possible stable even when these temperature conditions and the like fluctuate. Since for the controller of the image reader an oscillator with extremely high stability is used, such as a crystal oscillator and the like, by the signal from this stable oscillator the pulse emission of the fluorescent lamp is also subjected to oscillation control.

Furthermore, the measure that the oscillator present in the image reader and the oscillator present in the lighting part are located not separately for lamp emission, but in one piece advantageously eliminates the above described disadvantage of the deviation of the timing. If it is assumed in this case that the oscillator of the controller which is present in the image reader has a malfunction for some reason, the sensor and lamp emission are driven directly by the oscillation signal of this common oscillator. The disadvantage of the deviation of the timing of the two from one another is thus eliminated. This point is described in more detail below.

In FIGS. 7(a), (b) & (c), the respective time intervals of period T12 and period T23 can be distinguished from one another. However since both for the signals of the sensor shown in FIG. 7(a) and also for the lamp emission signals shown in FIGS. 7(b) & 7(c), the oscillator which is present in the controller of the image reader is used, a change in the respective time intervals of the period T12 and the period T23 in FIG. 7(a) means that the timing of lamp emission in the respective period changes. The disadvantages of agreement with the timing of the sensor signal and the deviation from the period as shown in FIGS. 7(b) and 7(c) therefore do not occur.

The object is achieved in a further aspect of the invention in that the above described controller 6 executes light control of the above described fluorescent lamp 2 by controlling the frequency of the reference signal for emission of the above described fluorescent lamp 2. This means that, by changing the period of the oscillation signal from the controller of the image reader, light control of the fluorescent lamp is enabled.

The invention is further described below using the drawings.

DETAILED DESCRIPTION OF THE INVENTION

Figure 1:
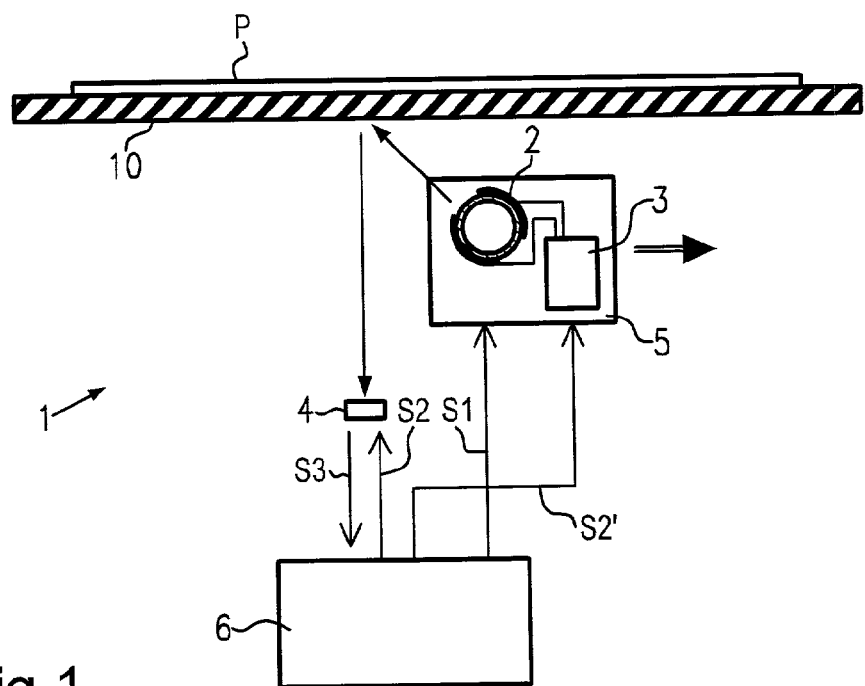
FIG. 1 shows a schematic of an image reader in accordance with an embodiment of the invention.
Figure 5:
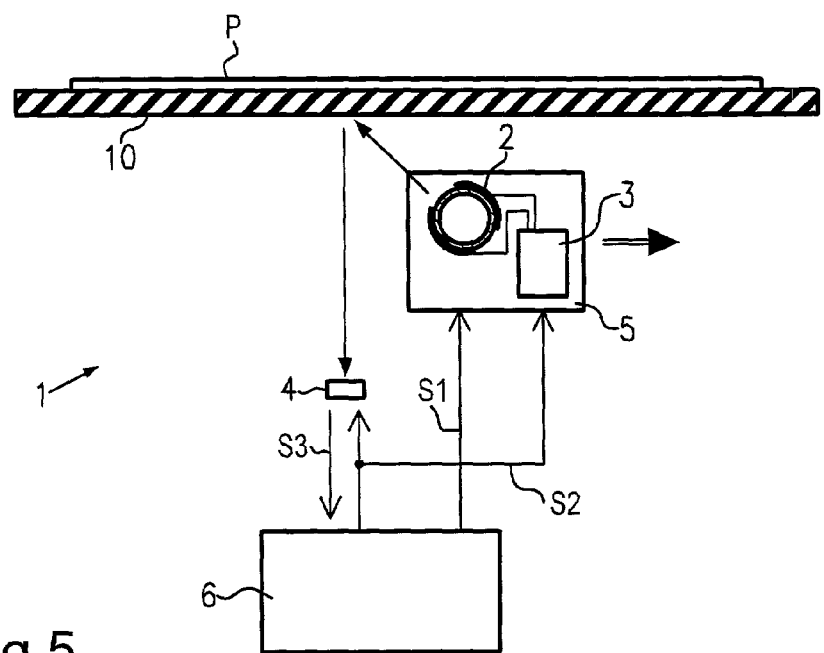
FIG. 5 shows a schematic of a conventional image reader.

FIG. 1 shows a schematic of an image reader in accordance with the invention and those elements which correspond to those of the conventional image reader of FIG. 5 have same reference numbers as in FIG. 5 and have the same function. Therefore, the following description will be confined to those aspects which differ from that of the reader of FIG. 5.

The difference from FIG. 5 is that the controller 6 sends not only the signal S2 which is synchronized with the reset of the sensor 4, but also during this reset signal a flashing signal S2' which causes the fluorescent lamp to emit.

In the arrangement shown in FIG. 1, an optical system comprised of a lens and a mirror is, strictly speaking, necessary between the lamp 2 and the sensor 4. However, for the sake of clarity this system is not shown in the drawings. Furthermore, there is a type in which the sensor 4 is installed in the unit 5 and moves together with the unit 5, a type in which the sensor 4 is attached outside of the unit 5, and a type in which the feed device 3 (inverter) is attached outside the unit 5.

The image reader of the invention has the feature that a fluorescent lamp using a dielectric barrier discharge is used for the lighting part. The reason for this is, as was described above, that this fluorescent lamp has the properties of lower power consumption, better start-up characteristic, less susceptibility to the effect of the environment and a longer service life than a halogen lamp, a hot cathode fluorescent lamp or a cold cathode fluorescent lamp.

Figure 2A:
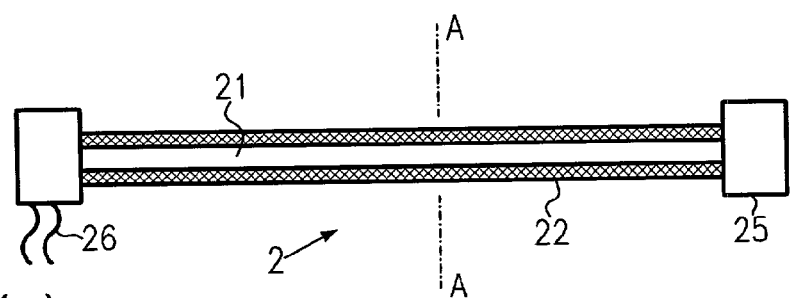
FIGS. 2(a) & 2(b) each show a schematic of a fluorescent lamp as claimed in the invention using a dielectric barrier discharge, FIG. 2(b) being a cross-sectional view along line A–A' in FIG. 2(a)
Figure 2B:
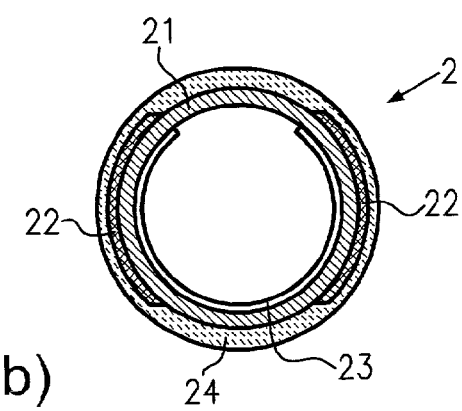

FIGS. 2(a) & 2(b) each schematically show a fluorescent lamp using a dielectric barrier discharge. FIG. 2(a) is an overall view of the fluorescent lamp and FIG. 2(b) being a cross section along line A–A' in FIG. 2(a).

In the fluorescent lamp 2, on the outside peripheral wall surface of a rod-shaped glass tube 21 which forms the discharge vessel, a pair of internal electrodes 22 is formed which are essentially strip-shaped and which run in the direction of the tube axis. The glass tube 21 is filled with a rare gas, such as xenon or the like. A fluorescing material 23 is applied to the inside wall surface of the glass tube 21. The entire glass tube 21, including the electrodes 22, is jacketed with a protective film 24. The ends of the glass tube 21 are provided with bases 25. From one of the bases extends a feed line 26 to which a feed device described below is connected. The numerical values are, for example, the following:

Outside diameter of the glass tube 21 is 10.0 mm.
The length of the glass tube 21 is 370 mm.
It is filled with 13 kPa xenon gas.

Since in such a fluorescent lamp 2 there is glass between the pair of electrodes 22 and it also acts as a dielectric, current does not flow in the discharge space directly out of the feed device when a voltage is applied between the electrodes. However, current flows since the dielectric acts as a type of capacitor.

To obtain radiant light with high efficiency by a dielectric barrier discharge, it is advantageous to provide a certain idle time duration after a discharge and to use an excimer discharge once generated without extinguishing it the next time voltage is applied. Therefore, generally, a method is pursued in which a high frequency AC voltage is not applied to such a fluorescent lamp, but in which a pulse emission is carried out. As the pulse emission method, a method using a fly-back voltage of a transformer and a method using a voltage-time change of the starting area of a pseudo-rectangular wave are pursued.

Figure 3:
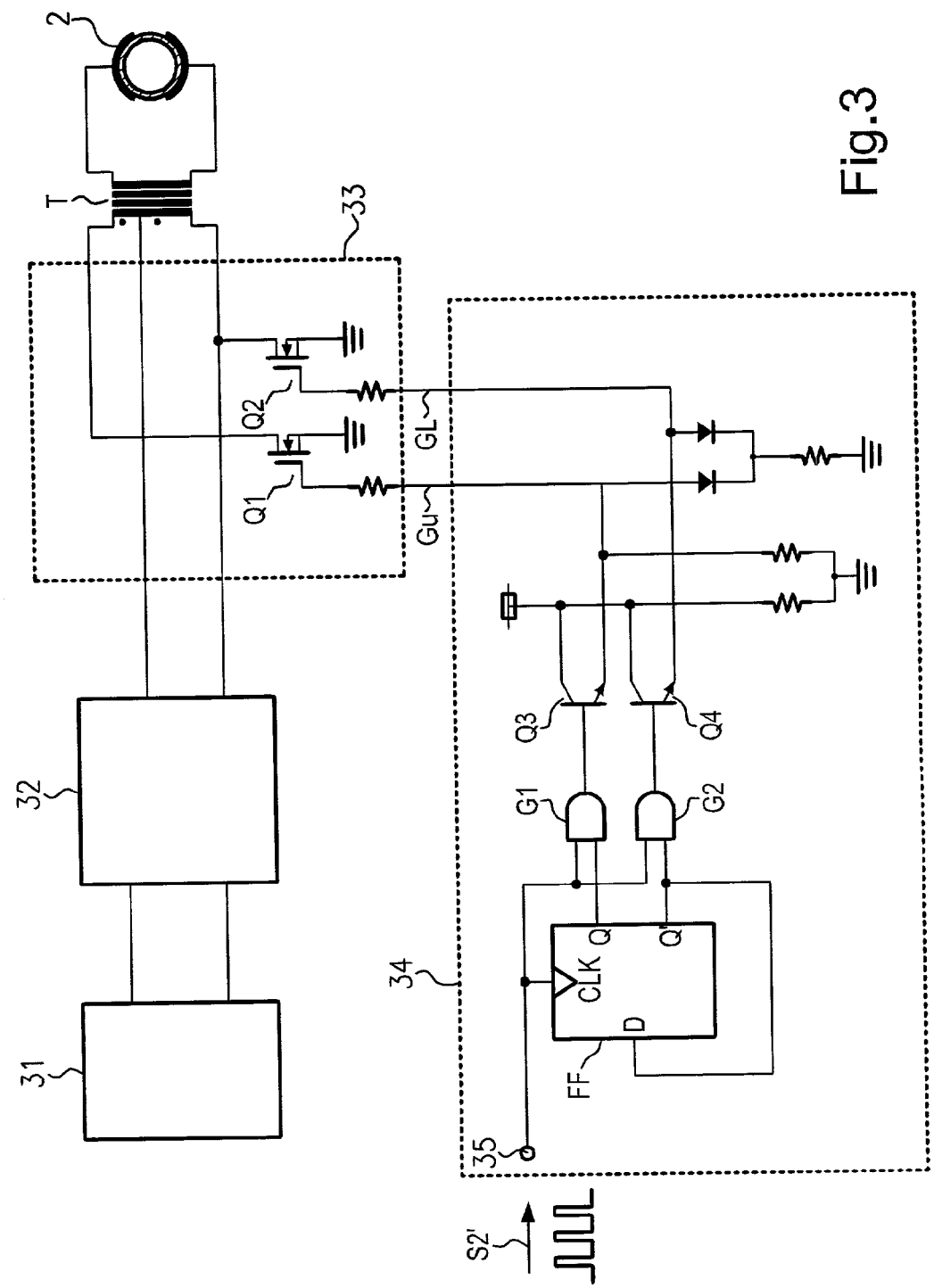
FIG. 3 shows a schematic of an inverter circuit of a feed device as in accordance with the invention.

In the following, an inverter circuit for operation of the fluorescent lamp 2 in a circuit type using a pseudo-rectangular wave is described. FIG. 3 shows the arrangement of a feed device 3. An inverter circuit 33 is connected to a DC source 31 via an set-up chopper circuit 32 and in the inverter circuit, the voltage is increased by turning on switching devices Q1 and Q2 at a transformer T in alternation. The inverter circuit is connected to a feed line 26 of the fluorescent lamp 2 which is connected to the secondary winding of the transformer T. The driver signals of the switching devices Q1 and Q2 are generated in the gate-signal generation circuit 34.

FIGS. 4(a)–4(e) each show a timing chart of a gate signal generation circuit 34 and together with the circuit diagram shown in FIG. 3 show the course of formation of this gate signal up to operation of the discharge lamp.

Figure 4A:
FIGS. 4(a)–4(e) each show the timing waver form of a feed device in accordance with the invention.
Figure 4B:

When the signal S2' from the controller 6 of the image reader 1 is input to the clock terminal CLK of a flipflop FF (shown in FIG. 4(a)) the flipflop FF is inverted in the manner shown in FIG. 4(b). The output Q of the flipflop FF and the inverted output Q' (shown in the drawings and hereinafter using an apostrophe on the Q) are each applied to one of the input terminals of the gate circuits G1 and G2.

Figure 4C:
Figure 4D:
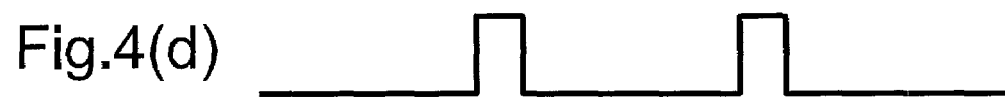

The two gate circuits G1, G2 output the two-phase pulse signals shown in FIG. 4(c) & 4(d) by which the switching devices Q3, Q4 are turned on in alternation. The outputs thereof are applied as gate signals GU, GL for the inverter circuit via resistors to the gate terminals of the switching devices Q1, Q2.

Figure 4E:
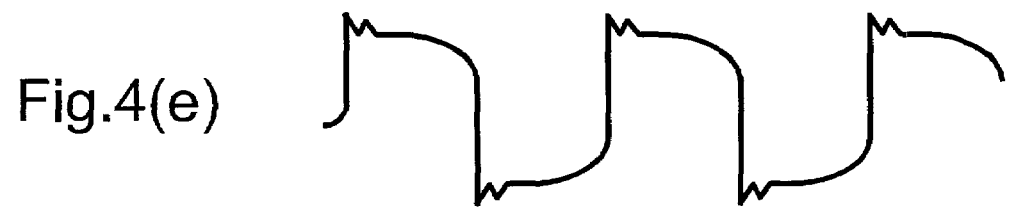

When one of the two gate signals GU, GL reaches an end level, accordingly one of the switching devices Q1, Q2 is turned on. The waveform of the voltage applied to the lamp changes steeply, as shown in FIG. 4(e), in the pole reversal direction, causing a discharge of the lamp 2.

Of the switching devices shown in FIG. 3, the flipflop FF, the gate circuits G1, G12, the transistors Q3, Q4 and the like are arranged as an integrated circuit in a package and are commercially available (for example, TL 494 produced by Texas Instruments). By using the latter, the above described circuit can be produced with a very small number of parts.

When the flashing signal is not input, one side of he flipflop FF reaches a high level. As a result, one of the switching devices Q1, Q2 maintains an ON state. When such a state continues, the problem occurs that an unduly high current flows into the transformer T and that magnetic saturation takes place. For the current circuit construction, therefore a circuit is required which solves this problem (for example, μPC494).

This arrangement directly drives the inverter circuit based on a stable flashing signal sent to the outside. The conventional disadvantage that the inverter circuit is influenced by the outside environment, such as the temperature of the control IC which the inverter circuit has and the like, is thus eliminated and execution of always stable lamp emission is enabled.

That is, within the period for one-time image recognition of the CCD line sensor, lamp emission with a fixed frequency can always be achieved with certainty. In this way, advantageous elimination of the disadvantage by scattering of the emission frequency of the lamp is enabled.

The inverter circuit is driven by direct reception of the oscillation signal from the controller which controls the sensor. This means that control is not carried out based on oscillators with separate timing. The sensor and the lamp are therefore both influenced in the same way even if it is assumed that the oscillator of the controller, for some reason, causes a delay of the timing and the like. Occurrence of the two timings in different ways does not take place.

The feature of the invention, to repeat it again, lies in that, not only the signal which shows the start of renewed image recognition, but the reference signal in and of itself for subsequent lamp emission is received directly by the controller on the side of the display which controls the CCD line sensor.

The arrangement of the controller 6 is described below.

Figure 9:
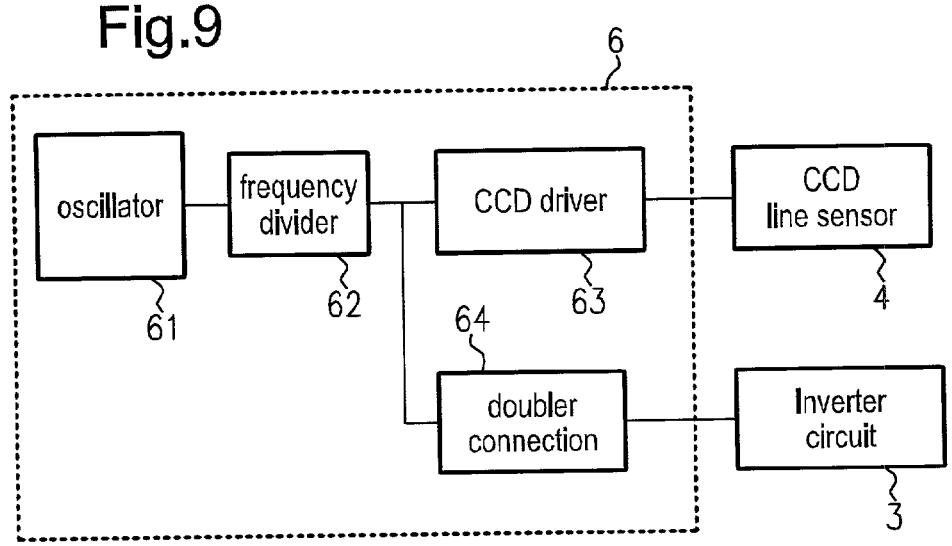
FIG. 9 shows a schematic of an example of a control circuit in accordance with the invention.

FIG. 9 shows the arrangement of the controller 6 and the transmission state to the inverter circuit 3 and the CCD line sensor 4. In the figure, an oscillator 61 with high stability is located in the controller 6 of the image reader 1 and from which frequency signals are sent via a frequency divider 62 to a CCD driver 63. In this frequency divider 62, the period for processing by the CCD line sensor 4 is determined. On the other hand, the synchronization signals produced in the frequency divider 62 are sent to a doubler connection 64 in which the frequency signal of lamp emission is produced within the above described period for processing. This signal is sent to the inverter circuit 3 of the lighting part 5. This frequency signal normally has 50 kHz to 80 kHz. A lower frequency, for example, 30 kHz, is, however, also possible. It must be determined considering the efficiency of the inverter circuit and of the lamp. There is the tendency for the light output of the lamp to decrease at a frequency of greater than or equal to 100 kHz.

The oscillator 61 does send signals to the frequency divider 62. The oscillator 61 however can moreover send signals to another frequency divider which can send signals to the inverter circuit 3.

Here, an intentional change of the emission frequency within the time interval for receiving (recognizing) an image in the CCD line sensor is also possible, instead of always keeping the frequency of the flashing signal from the controller 6 constant. This means that, in this case, light control of the image is enabled.

Figure 6A:
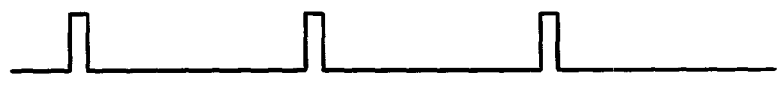
FIGS. 6(a) & 6(b) each show a schematic of the timing of image reception of a CCD line sensor and a pulse emission of a fluorescent lamp.
Figure 6B:
Figure 7A:
FIGS. 7(a)–7(c) each show a schematic of the timing of image reception of a CCD line sensor and a pulse emission of a fluorescent lamp.
Figure 7B:
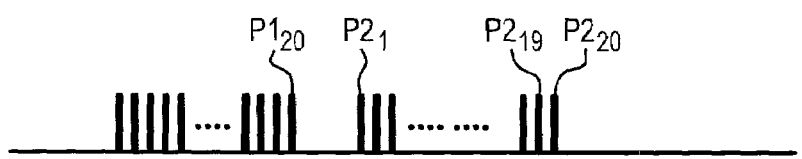
Figure 7C:
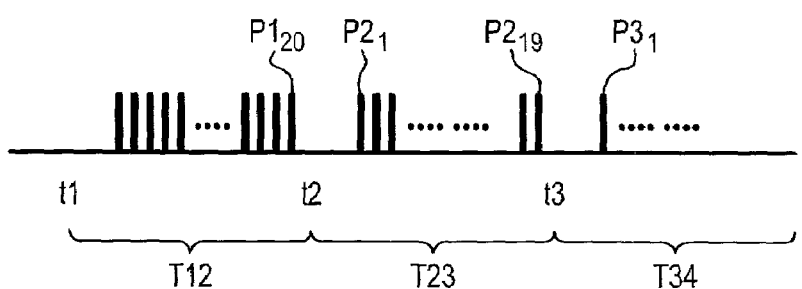

More specifically, a case can be designated in which, for example, pulse emission for the period T12 takes place 20 times and for the period T23 with a different frequency in the timing diagram in FIGS. 6(a) & 6(b).

In the above described embodiment, a case was described in which the flashing signal S2' is input from the image reader directly to the flipflop of the feed device. However, this case is only intended as one preferred example. In practice, there are cases in which the flashing signal is changed based on the type of control IC used for control, as described above, of the Texas Instruments TL494 type or the like, on the circuit type and for similar reasons.

Figure 8A:
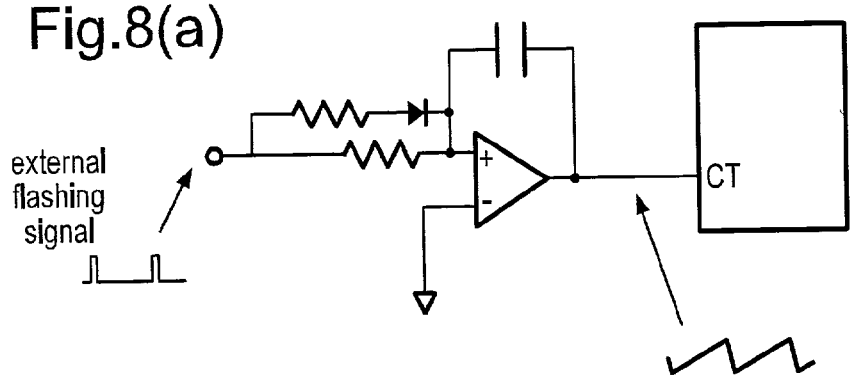
FIGS. 8(a) & 8(b) each show a schematic of a circuit for straightening the waveform of a feed device in accordance with the invention.
Figure 8B:
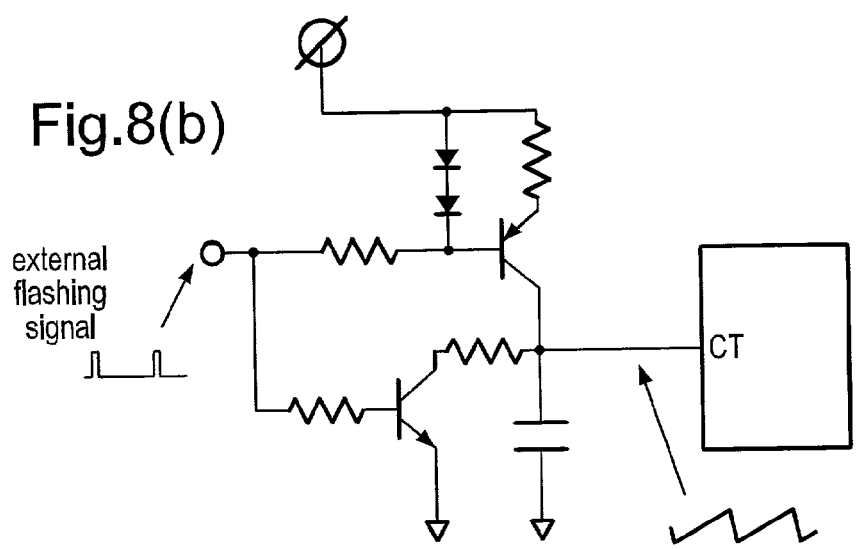

FIGS. 8(a) & 8(b) each show a circuit for generating the waveform. Both in FIG. 8(a) and also in FIG. 8(b), the flashing signal S2' is converted from the outside from a rectangular wave into a sawtooth wave. In this case too, the waveform can be converted due to the signal processing in the gate signal generation circuit 34. That the generation of the gate signal is driven directly as a result of the emission command from the controller 6 therefore remains unchanged.

The circuit shown in FIG. 3, in practice, is provided with feedback stabilization control or the like which controls the output power Vj of the chopper circuit 32 to be constant, and consequently, controls the making power into the lamp to be constant. However, the description of this is omitted in this embodiment.

The further details of the circuit operation described in the embodiment, for example, the polarity of the signals, the specific choice, the specific insertion and omission of the circuit devices or concepts, such as changes and the like based on facilitating the procurement of components and for economic reasons, are of course considered in the practical construction. The invention does not preclude these examples of modifications.

What is claimed is:

1. Image reader which comprises:
 a lighting part having a fluorescent lamp which produces pulse emission by dielectric barrier discharge, and an inverter circuit which feeds the fluorescent lamp;
 a CCD line sensor which continuously receives reflection light reflected by a manuscript and emitted by the fluorescent lamp, time-divided; and
 a controller which resets a divided image which is recognized by the CCD line sensor and which controls the timing of the start of recognition of a next divided image and moreover sends signals about this timing to the lighting part;
 wherein the controller, within an image recognition period in which the CCD line sensor recognizes a divided image of the manuscript, sends a flashing signal to the inverter which commands pulse emission of the fluorescent lamp with a frequency which is the same as the frequency of the flashing signal in order to keep luminous quantities of the fluorescent lamp at a given value.

2. Image reader as claimed in claim 1, wherein the frequency of the flashing signal is controllable as a light control of the fluorescent lamp.

* * * * *